Patented Mar. 24, 1953

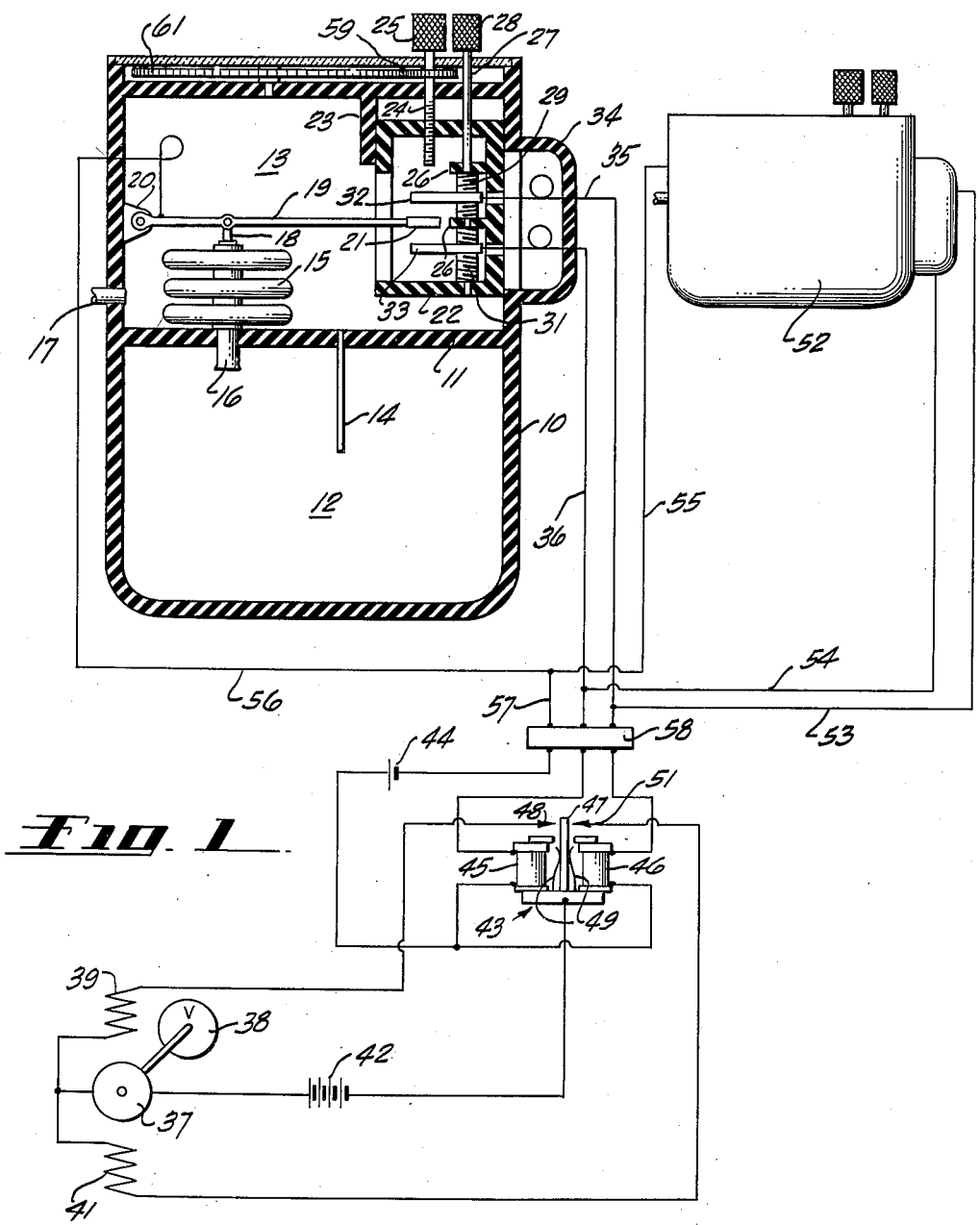

2,632,374

UNITED STATES PATENT OFFICE 2,632,374

AIRCRAFT CABIN RATE OF CLIMB CONTROL INSTRUMENT

Wolfgang B. Klemperer, Los Angeles, Calif., assignor to Douglas Aircraft Company, Inc., Santa Monica, Calif.

Original application April 6, 1942, Serial No. 437,921. Divided and this application March 20, 1951, Serial No. 216,567

16 Claims. (Cl. 98—1.5)

This invention relates to pressure regulating instruments and more particularly to such an instrument for regulating the time-rate-of-pressure-change especially useful in systems for controlling the pressure of the air of pressurizable aircraft cabins.

This application is a division of my copending application, Serial No. 437,921, filed April 6, 1942, now U. S. Patent No. 2,549,690. In the pressure regulating system therein shown, as in substantially all such systems, the absolute pressure within the cabin is varied by controllably varying the rate of air discharge from the cabin relative to the rate of air delivery to the cabin. The air delivered to the cabin is furnished by superchargers of like blowers which are capable of delivering air to the cabin at a pressure greater than ambient flight pressure. In such systems the rate of air discharge is varied by valve means, the position of which is controlled by a suitable operating means regulating the flow of vitiated air through an opening formed in the cabin wall.

Considerable development has been undertaken in the past toward providing means to control the pressure in aircraft cabins along certain predetermined schedules. Initial efforts were directed toward maintaining cabin absolute pressure constant at an intermediate altitude whenever flight above that altitude was attempted. Control of cabin pressure at the constant value of an intermediate altitude has been found impractical, since it is obvious that little had been achieved in isolating the passengers of the cabin from the rather rapid changes in pressure during the ascents and descents in a region where the air is most dense and where the pressure thereof changes most rapidly with changes in altitude.

Control means have also been previously proposed which controlled cabin pressure in some predetermined relation to the change in pressure of the flight atmosphere so that cabin absolute pressure was varied in proportion to changes in flight pressure. These so-called ratio control systems, although some improvement over the constant altitude pressure systems, did not provide means for regulating the time-rate-of-pressure-change within the cabin during ascents and descents of the aircraft at rates which produced a time-rate-of-pressure-change within the cabin too great for passenger comfort.

The control instrument of the present invention obviates the difficulties had with previously proposed control systems by providing for controlling the time-rate-of-pressure-change within the cabin. This is brought about by so connecting the instrument of the present invention into the system as to selectively operate the means controlling the position of the air discharge valve means. As the instrument will, therefore, control the rate of air discharge from the cabin, it will, in turn, regulate or control the time-rate-of-pressure-change within the cabin.

The instrument furthermore provides means for preselecting the time-rate-of-pressure-change so that the rate can be controlled to change from a given or starting cabin pressure to a desired cabin pressure at any predetermined desired rate. The instrument of the present invention also provides means which will permit or induce a change of pressure within the cabin, whether an increase or a decrease, at a preselected rate and regardless of the change or rate of change of ambient or flight altitude pressure. Thus the instrument may be used to induce a preselected rate of increase in cabin absolute pressure even though the aircraft is maintained in level flight. This feature of the instrument is highly advantageous for it permits the pilot or flight engineer to induce an apparent decrease in the simulated altitude of the cabin as the aircraft continues to fly in level flight and then at some later period of time rapidly descends to the airport.

The instrument on the other hand can be used merely as a limiting or vetoing instrument to override and limit the control action of other pressure regulating instruments of the system to thereby limit the rate of pressure change within the cabin. In any event, the instrument of the present invention is always operative to limit or regulate the time-rate-of-pressure-change within the cabin to the preselected rate.

Other features and advantages of the invention will be readily understood from the following detailed description taken with the accompanying drawing, in which the single figure is a sectional view of one embodiment of the instrument of the present invention showing one form of a control circuit with which the instrument can be used.

The control instrument of the present invention, referring now to the drawing, comprises a case or housing 10 having a dividing or transverse wall 11 forming with the other wall elements of the case 10 a pair of chambers 12 and 13. The chamber 12 is hermetically sealed and communicates with the chamber 13 through a capillary tube 14 which pierces the transverse wall 11. It will thus be seen that the chamber 12 is in restrictive communication with the chamber 13 and any change of pressure of air held by chamber 13 will be slowly communicated to the chamber 12.

Suitably mounted to the one face of the transverse wall 11 and disposed within the chamber 13 is a pressure responsive capsule assembly 15, the interior of which communicates through a short conduit 16 with the interior of the chamber 12. The exterior of the capsule assembly 15 is to be subject to cabin absolute pressure for the chamber 13 in which the capsule assembly is mounted communicates with cabin absolute pressure through the conduit 17. It should now be seen that the capsule assembly 15 will respond to changes in the rate of absolute pressure change within the cabin for pressure changes cannot quickly equalize in the two chambers.

The capsule assembly 15 carries at its movable end a small lug 18 to which is pivotally mounted a control arm 19 intermediate the ends of the latter. The one end of the control arm 19 is pivotally mounted to a small bracket 20 carried on the interior of the case 10. The opposite end of the control arm 19 carries a contact element 21 which, as the capsule assembly 15 expands and contracts, moves with the arm 19 in opposite directions.

Slidably mounted within the case 10 is a support 22 which is mounted for reciprocal movement by guide elements, one of which is indicated at 23. The position of the support 22 is reciprocally adjusted by means of a shaft 24 rotatably supported by one wall of the case 10 and having the inner end thereof threadedly engaged in a tapped opening formed in the support 22. As the support 22 is held against rotational movement with the shaft 24, it will be seen that rotation of the latter will produce reciprocal movement of the support 22, the direction of movement of the support 22 being dependent upon the direction of rotation of the shaft 24. To facilitate rotation of the shaft 24 the outer end thereof carries a knurled operating knob 25.

The support 22 carries a pair of lugs 26 partially supporting for rotation a shaft 27 which pierces the one wall of the case 10 to terminate at its outer end in a knurled operating knob 28. The shaft 27 is formed with a pair of spaced enlarged sections, the one section being formed with screw threads 29 opposite in pitch to screw threads 31 formed on the other enlarged section of the shaft. The threaded enlarged sections of the shaft are used to mount a pair of contacts 32 and 33 held by any suitable means desired against rotation with the shaft 27. It should now be seen that rotation of the shaft 27 through manipulation of the knob 28 will result in opposite relative movement of the contacts 32 and 33. The relative distance between the contacts 32 and 33 can, therefore, be easily changed or varied merely by rotation of the shaft 27. On the other hand rotation of the shaft 24 will produce conjoint simultaneous movement of the contacts 32 and 33.

It will now be seen that as the capsule assembly 15 expands and contracts in response to changing rates of pressure increase or decrease within the cabin, the control arm 19 will function as a switch arm to move the contact 21 into engagement with one or the other of the switch means or contacts 32 and 33, depending upon the direction of movement of the arm 19.

The instrument includes a suitable lead-in element 34 for electrically connecting conductors 35 and 36 to the contacts 32 and 33 respectively. The conductors 35 and 36 form a portion of one embodiment of a control circuit with which the instrument of the present invention can be used. This control circuit is schematically shown in the drawing and comprises a motor 37 which, through a suitable gear train, not shown, operates a valve 38 used to control the rate of air discharge from the cabin. The motor 37 is reversible and may be energized either through the field coil 39 or 41 by power from some suitable source such as the battery 42 to drive the valve in alternate directions depending upon the direction of rotation of the motor 37.

Automatic control of the valve 38 is effected through a control relay 43 which, as shown for illustrative purposes, is essentially a power amplifier in which very small currents from a battery 44 can be used to selectively energize the coils 45 and 46 of the relay 43 to control a flow of relatively large current in the circuits of the motor field coils 39 and 41. Energization of relay coil 45 causes the armature 47 of the relay 43 to move to the left, as viewed in the figure, and into engagement with a contact 48 against the action of one of a pair of centering springs 49 to complete a circuit from the battery 42 through the circuit of the field coil 39. Energization of this field coil produces such directional rotation of the motor to drive the valve 38 toward an open position to increase the rate of air discharge from the cabin.

On the other hand energization of relay coil 46 causes the armature 47 of the relay 43 to move to the right, as viewed in the figure, to engage with contact 51 against the action of the other of the pair of centering springs 49 to complete a circuit from the battery 42 through the circuit of the field coil 41. The completion of this circuit, as should now be understood, causes the motor 37 to drive the valve 38 in the opposite direction, that is toward closed position, to decrease the rate of air discharge from the cabin.

Energization of the relay 43 is in part controlled by pressure responsive means schematically shown at 52. The control means schematically shown in 52 may comprise any control elements desired which will regulate cabin pressure along some preselected or desired pressure schedule as the aircraft is flown at altitudes at which pressurization is desired. This control means could comprise either the cabin altimeter 78 or the pressure regulator 24 of my copending application above identified. The control means 52 is electrically connected by leads 53 and 54 to the conductors 35 and 36 respectively of the control circuit previously described. A grounding conductor 55 electrically interconnects a conductor 56 leading to the control arm 19 and conductors 55 and 56 are in turn connected to a common ground conductor 57.

To prevent overloading of the contacts forming a part of the control circuits, an electronic relay schematically indicated at 58 may be used.

It will thus be seen that if the circuit, of which the conductor 54 forms a part, is energized by the control means 52, the relay coil 45 will be energized to bring about opening movement of the valve 38. If, on the other hand, the control circuit, of which the conductor 53 forms a part, is energized, the relay coil 46 will be energized to produce closing movement of the valve 38.

Regardless of the type of control instrument 52 used, whenever in its operation it so controls the motor 37 as to produce, through the resulting movement of the valve 38, a time-rate-of-pressure-change within the cabin in excess of some preselected rate, the instrument of the present invention is operative to veto the control action sought to be effected by the instrument 52. The preselected rate of pressure change is effected through adjustment of the shaft 24 by manipulating the control knob 25 which, it will be remembered, slidably moves the support 22 and consequently the contacts 32 and 33 mounted thereto.

To indicate the setting to the operator, the shaft 24 carries a pinion 59 which meshes with and drives a gear 61 which carries on its front face a scale, not shown, but which can be graduated into units of increase or decrease of altitude per unit of time.

If, for example, the control instrument schematically shown at 52 was a control instrument such as the altimeter 78 of my copending application and the aircraft was flying at an altitude of 9000 feet with a simulated cabin altitude of 8000 feet and the aircraft was about to descend to an airport, the shaft 24 could be adjusted to position contact 32 to effect the desired descent at the preselected rate-of-pressure-change within the cabin. As the aircraft descended to an altitude of 8000 feet, the pilot or flight operator would reset the instrument 52 to an altitude substantially equal to the altitude of the airport. As soon as the instrument 52 was reset to the lower altitude, control action of this instrument would then result in energization of the relay coil 46, which, it will be remembered, brings about closing movement of the valve 38. This is so, for the instrument 52 would attempt to bring cabin pressure to a value equal to the pressure valve of the altitude of the airport.

This rapid movement of the valve 38 toward closed position would produce an increase of cabin pressure at a rate greater than the preselected rate. The pressure within the cabin and consequently chamber 13 would immediately increase over that in chamber 12 and the larger exterior pressure would tend to collapse the capsule assembly 15. As soon as the time-rate-of-pressure-change equaled the preselected rate, the pressure capsule assembly 15 will move contact 21 into engagement with contact 33 to complete a circuit through the relay coil 45. If at the time relay coil 45 is energized, relay coil 46 is also energized because of the control action of the instrument 52, the centering springs 49 will move the armature 47 into the central or balanced position in which it is out of engagement with both contacts 48 and 51. This, of course, would immediately de-energize the motor 37 to arrest movement of the valve 38 and thus hold the valve 38 in the position at which the rate of air discharge from the cabin produced the time-rate-of-pressure-change within the cabin equal to the preselected rate.

It will thus be seen that in this operation of the control instrument of the present invention, the instrument vetoes the control action sought to be effected by the instrument 52 and limits the rate-of-pressure-change within the cabin during the descent of the aircraft to one substantially equal to the preselected rate.

To explain other operational features of the instrument of the present invention, let us assume that the aircraft is to take off from an airport at an altitude of 500 feet and the pilot wished to maintain the cabin at a simulated altitude of 8000 feet as the aircraft ascended to altitudes in excess of 8000 feet. In this flight schedule, the instrument 52 would be initially set so as to be inoperative to control cabin pressure as the aircraft ascended.

If the aircraft climbed at such a rate as to produce within the cabin a time-rate-of-pressure-change in excess of the preselected rate, the pressure capsule assembly 15 would expand and in expanding would move contact 21 into engagement with contact 32, thus energizing relay coil 46 to produce closing movement of the valve 38. Closing movement of the valve 38 will obviously decrease the time-rate-of-pressure-change within the cabin as the aircraft continues to ascend. So long as the aircraft was operated below the 8000 foot altitude, the control insrument of the present invention will act as the primary control instrument and maintain the time-rate-of-pressure-change within the cabin at the preselected rate. As the aircraft approached an altitude of 8000 feet the control instrument 52 would then be set to maintain a simulated altitude of 8000 feet in the cabin as the aircraft climbed to altitudes in excess of 8000 feet.

One of the features of the instrument of the present invention resides in the fact that the instrument can be used to induce a time-rate-of-pressure-change within the cabin independently of the actual flight path of the aircraft. Thus, if the aircraft was being operated in mountainous country and the next scheduled landing was to be made at an airport surrounded by mountains, the pilot or flight engineer could reset the control instrument 52 to the altitude of the airport and thus bring about movement of the valve 38 as the aircraft continued to fly in level flight. This movement of the valve obviously would produce a time-rate-of-change pressure within the cabin and the instrument of the present invention would thereafter so control operation of the motor 37 as to limit the time-rate-of-pressure-change within the cabin to the preselected rate even though the ambient flight pressure remained substantially constant. This feature permits the pilot to slowly increase pressure within the cabin to simulate a descent even though the aircraft continues to fly sometime thereafter in level flight and then descends rapidly to the airport.

The instrument of the present invention would be used by itself to control operation of the motor 37 and does not require a second control instrument such as the one schematically shown at 52. The control instrument 52, whatever be its type, is only to effect elevation of cabin pressure over ambient flight pressure so that if the aircraft was to be operated at altitudes requiring no substantial increase of cabin absolute pressure, the instrument of the present invention will function to limit the time-rate-of-pressure-change within the cabin. If, for example, no control instrument, such as schematically shown at 52, was included in the control system, the instrument of the present invention would, as the aircraft ascended, prevent a time-rate-of-pressure-change greater than the preselected rate. This is so, for if the aircraft in ascending at a rate which produced a time-rate-of-pressure-change within the cabin substantially equal to the preselected rate, the expanding capsule assembly 15 would bring about engagement of the contact 21 with the valve closing contact 32 and thus prevent a time-rate-of-pressure-change greater than the preselected rate.

It can be pointed out here that as soon as the valve 38 commences to move toward closing position, the time-rate-of-pressure-change within the cabin would obviously decrease as the pressure increased and the increasing pressure would tend to collapse the pressure capsule assembly 15 and if, in collapsing, contact 21 moved into engagement with contact 33, the valve would be moved toward open position. The contact 21 would thus hunt between contacts 32 and 33 as the aircraft continued to ascend. The degree of hunting of the contact 21 under the urgings of the capsule assembly 15 can be reduced by operation of the shaft 27 in the direction necessary to bring the contacts 32 and 33 into a relative position in which there is little clearance between the contact 21, in the zero position of the control arm 19, and each of the contacts 32 and 33.

In principle the described instrument is a timer or time control device because the movement of the arm 19 is dependent on the time rate of flow of air through the tube 14. It will be seen that the power for operating the time control device is the pressure difference internally and externally of the capsule assembly. The device generally incorporates a reservoir (chamber 12) and a passage (tube 14) for restricted flow into and out of the reservoir to vary the charge in the reservoir and the time delay provided is based on the time required for the reservoir to charge or discharge through the restricted passage. The pressure differential across the restricted passage is the difference between cabin pressure and the reservoir pressure, and the capsule assembly or bellows 15 forms in effect, a movable wall sensitive to this pressure differential. The movable wall formed by the capsule assembly is operatively connected, through the arm 19 which forms an actuator means or as will be later shown, a control effecting means for, the pressure control system or pressure control servo mechanism of the aircraft. The actuator means formed by the arm 19, as it is moved through responses of the capsule assembly 15 in accordance with the changing relationship of cabin pressure and reservoir pressure, coacts with the switch means formed by the contacts to control the operation of the valve motor as to variably position the valve to so regulate the change in cabin pressure as to prevent an excessive rate of pressure change within the cabin. This is so for the rate of flow through the tube 14, that is, the capability of the restricted passage to equate the pressure acting on the movable wall varies the charge in the reservoir at a given maximum rate, as cabin pressure changes in excess of that rate, and in so doing bring about movement of the actuator means to limit the change in cabin pressure to a given maximum rate. In this way the instrument delays or prolongs a change in cabin pressure from a starting pressure to a desired pressure to a degree required for the comfort of the passengers.

The contacts 32 and 33 form, as should now be understood, control means for controlling operation of the discharge valve of the system which in turn controls the rate of air discharge from the cabin. The arm 19, as it effects operation of the control means formed by the contacts, thus provides in the instrument a control effecting means. It has been seen that the control means can be rendered operative independently of the capsule assembly by variably positioning the contact means relative to the control effecting means formed by the arm 19.

The instrument of the present invention, when used in a system having another control instrument, acts in opposition to the control action sought to be effected by the other instrument to limit the time-rate-of-pressure-change within the cabin, whether that change is produced by the other instrument of the system as reflecting a change in altitude of the aircraft or conjointly with the other instrument as when the latter is reset in flight to induce a pressure change within the cabin. It is believed now that the operation of the control instrument of the present invention, whether it be used alone to control operation of a valve such as the valve 38 or used in conjunction with some other control instrument, should be perfectly clear. In the broadest aspects of the present invention the instrument is one, as should now be recognized, which will so control the position of a discharge valve as to controllably vary the rate of air discharge from the cabin, and so control the rate as to limit the time-rate-of-pressure-change within the cabin to a preselected maximum rate.

Although the now preferred embodiment of the present invention has been shown and described herein, it is to be understood that the invention is not to be limited thereto, for it is susceptible to changes in form and detail within the scope of the appended claims.

I claim:

1. An instrument for use in a system for regulating pressure in an aircraft cabin which system includes means to effect and control air outflow from the cabin, comprising: a housing to be mounted within said cabin and including means for communicating the interior of said housing with said cabin; means within said housing responsive to and motivated by the rate of pressure change within the housing; control means carried by said housing and including means adapted to be operatively connected to the means of said system effecting and controlling outflow from the cabin for controlling operation of the same; and control effecting means within said housing for producing operation of said control means; said control effecting means actuated by said pressure change responsive means to produce an operation of said control means in response to a preselected rate of pressure change within said housing.

2. An instrument for use in a system for regulating pressure in an aircraft cabin which system includes means to effect and control air outflow from the cabin, comprising: a housing to be mounted within said cabin and including means for communicating the interior of said housing with said cabin; a device mounted in said housing and responsive to the rate of change of air pressure within said housing and including an element movable by, and in proportion to the rate of change of said pressure; and power transmission means carried by said housing and adapted to be operatively connected to the air outflow effecting and controlling means of said system; said power transmission means being rendered operative by movement of said element to control the time-rate-of-pressure-change in said cabin.

3. An instrument for use in a system for regulating pressure in an aircraft cabin which system includes means to effect and control air outflow from the cabin, comprising: means to be mounted within said cabin for sensing the rate of pressure change within said cabin and including means for transmitting energy indicative of the rate of pressure change within said cabin; and control effecting means including means adapted to be operatively connected to the means of the system effecting and controlling air outflow from the cabin for controlling operation of the same, said control effecting means actuated by the energy transmitted by said rate of pressure change sensing means and adapted to produce an operation of said outflow effecting and control means to control the time-rate-of-pressure-change within said cabin.

4. An instrument for use in a system for regulating pressure in an aircraft cabin, which system includes means to effect and control air outflow from the cabin for varying the rate of air outflow, comprising: control regulating means to be mounted within said cabin, said control regulating means including control means adapted to be operatively associated with the means of said system effecting and controlling air outflow from the cabin for controlling operation of the same, control effecting means operatively coacting with said control means for actuating the latter to control operation of the air outflow control means of said system, and means, including a time controlled device, operatively connected to said control effecting means to selectively operate the latter whereby said control effecting means coacts with said control means to produce a preselected operation of said outflow effecting and controlling means to vary the rate of air outflow from said cabin to thereby control the time-rate-of-pressure-change within said cabin at a preselected value as the air pressure in said cabin is changed from a starting pressure to a desired pressure.

5. An instrument for use in a system for regulating pressure in an aircraft cabin, which system includes means to effect and control air outflow from the cabin for varying the rate of air outflow, comprising: control regulating means to be mounted within said cabin, said control regulating means including control means adapted to be operatively associated with the means of said system effecting and controlling air outflow from the cabin for controlling operation of the same, control effecting means operatively coacting with said control means for actuating the latter to control operation of the air outflow control means of said system, and means, including a time controlled device, operatively connected to said control effecting means to selectively operate the latter whereby said control effecting means coacts with said control means to produce a preselected operation of said outflow effecting and controlling means to vary the rate of air outflow from said cabin to thereby control the time-rate-of-pressure-change within said cabin at a preselected value as the air pressure in said cabin is changed from a starting pressure to a desired pressure; and presettable means for varying the action of said control effecting means whereby the time-rate-of-pressure-change within said cabin may be preselectively varied.

6. An instrument for use in a system for regulating pressure in an aircraft cabin, which system includes means to effect and control air outflow from the cabin for varying the rate of air outflow, comprising: control regulating means to be mounted within said cabin, said control regulating means including control means adapted to be operatively associated with the means of said system effecting and controlling air outflow from the cabin for controlling operation of the same, control effecting means operatively coacting with said control means for actuating the latter to control operation of the air outflow control means of said system, and means, including a time controlled device, operatively connected to said control effecting means to selectively operate the latter whereby said control effecting means coacts with said control means to produce a preselected operation of said outflow effecting and controlling means to vary the rate of air outflow from said cabin to thereby control the time-rate-of-pressure-change within said cabin at a preselected value as the air pressure in said cabin is changed from a starting pressure to a desired pressure; presettable means for varying the action of said control effecting means whereby the time-rate-of-pressure-change within said cabin may be preselectively varied; and means for rendering said control means operative to produce control operation of said outflow controlling means of said system to induce cabin pressure to change at a preselected value in accordance with the setting of said presettable means.

7. An instrument for use in a system for regulating pressure in an aircraft cabin which system includes means to effect and control air outflow from the cabin, comprising: a housing to be mounted within said cabin and including means for communicating the interior of said housing with said cabin; means within said housing sensing the rate of pressure change within said housing and including means for transmitting energy indicative of the rate of pressure change within said housing; control means carried by said housing and including means adapted to be operatively connected to the means of said system effecting and controlling air outflow from the cabin for controlling operation of the same; and control effecting means within said housing actuated by the energy transmitted by said first named means and adapted to produce an operation of said control means thereby to controllably operate said outflow effecting and controlling means in response to a preselected rate of pressure change within said housing.

8. An instrument for use in a system for regulating pressure in an aircraft cabin which system includes means to effect and control air outflow from the cabin, comprising: means to be mounted within said cabin sensing the rate of pressure change within said cabin and including means for transmitting energy indicative of the rate of pressure change within said cabin; control means including means adapted to be operatively connected to the means of said system effecting and controlling air outflow from the cabin for controlling operation of the same; control effecting means actuated by the energy transmitted by said sensing means to produce an operation of said control means in response to a preselected rate of pressure change within said cabin; and means for rendering said control means operative to produce an operation of said outflow effecting and controlling means independently of said sensing means to induce cabin absolute pressure to change at a preselected rate.

9. An instrument for use in a system for controllably regulating pressure within an aircraft cabin, which system includes means for supplying air under pressure and having air discharge means for varying the rate of air discharge from said cabin, comprising: a housing to be mounted within said cabin; wall means forming a sealed reservoir within said housing; means carried by said housing forming a restricted orifice to place the reservoir in communication with the interior of the cabin for airflow into and out of said reservoir in accordance with variations in cabin absolute pressure; control means, including means to be operatively connected to the air discharge varying means of said system, for controlling operation of the same; and control effecting means actuating said control means whenever a preselected rate of change of cabin absolute pressure produces a change in the relationship between cabin absolute pressure and reservoir pressure to control operation of said discharge means to vary the rate of air discharge from said cabin in accordance with the relationship of cabin absolute pressure and reservoir pressure to thereby vary the time rate of pressure change within said cabin.

10. An instrument for use in a system for controllably regulating pressure within an aircraft cabin, which system includes means for supplying air under pressure and having air discharge means for varying the rate of air discharge from said cabin, comprising: a housing to be mounted within said cabin, said housing having wall means forming a reservoir; means carried by said housing forming a restricted orifice to place the reservoir in communication with the cabin for airflow into and out of said reservoir at a restricted rate to vary the air pressure in the reservoir in accordance with variations in cabin absolute pressure and to cause the changes in reservoir pressure to lag behind the changes in cabin absolute pressure; a movable wall sensitive to variations in the difference in cabin absolute pressure and reservoir pressure; and actuator means, including means adapted to be operatively connected to said movable wall for movement thereby and to said air discharge means for producing operation of said air discharge means as said movable wall responds to variations in the difference between cabin absolute pressure and reservoir pressure.

11. An instrument for use in a system for controllably regulating pressure within an aircraft cabin, which system includes means for supplying air under pressure and having air discharge means for varying the rate of air discharge from said cabin, comprising: a housing to be mounted within said cabin, and including wall means forming a sealed reservoir within said housing; means carried by said housing to place the reservoir in communication with the interior of the cabin for airflow into and out of said reservoir at a restricted rate to vary the air pressure in the reservoir in accordance with variations in cabin absolute pressure; means subject to, and operable in response to a change in, the pressure of the air within said reservoir; control means, including means to be operatively connected to the air discharge varying means of said system; and control effecting means for producing operation of said control means, said control effecting means actuated by said pressure change responsive means whenever the rate of change of cabin absolute pressure produces a preselected change in the pressure of the air within said reservoir and thereby producing operation of said air discharge varying means of the system.

12. An instrument for use in a system for regulating pressure in an aircraft cabin which system includes means to effect and control air outflow from the cabin, comprising: a housing to be mounted within said cabin and including means for communicating the interior of said housing with said cabin; means within said housing sensing the rate of pressure change within said cabin and including means for transmitting energy indicative of the rate of pressure change within said cabin; control means carried by said housing and including means adapted to be operatively connected to the means of the system effecting and controlling air outflow from the cabin for controlling operation of the same; control effecting means for producing operation of said control means; said control effecting means actuated by the energy transmitted by said first named means and adapted to produce an operation of said control means to effect operation of said outflow effecting and control means to control the time-rate-of-pressure-change within said cabin; and means for selectively adjusting the action of said control effecting means to vary the actuation thereof in response to energy transmitted by said sensing means thereby to vary the operation of said outflow effecting and controlling means and the resultant time-rate-of-pressure-change within said cabin.

13. An instrument for use in a system for controllably regulating pressure within an aircraft cabin, which system includes means for supplying air under pressure and having air discharge means for varying the rate of air discharge from said cabin, comprising: a housing to be mounted within said cabin, said housing having wall means forming a reservoir; means carried by said housing to place the reservoir in communication with the cabin for airflow into and out of said reservoir at a restricted rate to vary the air pressure in the reservoir in accordance with variations in cabin absolute pressure; control means carried by said housing and including means to be operatively connected to the air discharge means of said system and adapted to operate the same to vary the rate of air discharge from said cabin; pressure responsive means having one side subjected to the pressure within the reservoir; control effecting means mounted within said housing and actuated by said pressure responsive means to produce operation of said control means; means, including manually operable means, for applying a control force to said control effecting means to produce a preselected operation of said control means whereby the latter is actuated to so control operation of said air discharge means as to vary the rate of air discharge from said cabin and in turn produce a preselected time-rate-of-pressure-change within the cabin.

14. A pressure regulating instrument for use in a system for regulating pressure in an aircraft cabin whereinto air is supplied by an air delivery means and from which vitiated air is discharged through a valve regulated by electro-responsive means, comprising: a housing to be mounted within said cabin, said housing including wall means defining a reservoir; means carried by said housing forming a restricted orifice to place the reservoir in communication with the interior of the cabin for airflow into and out of said reservoir at a restricted rate to vary the air pressure in the reservoir in accordance with variations in cabin absolute pressure; a pressure responsive capsule mounted within said housing and responsive on the one side to changes in cabin absolute pressure and on the other side to changes in pressure within said reservoir; a pair of contacts, including means adapted to be operatively connected to said electro-responsive means of said system; a switch arm carried within said housing and disposed intermediate said contacts, said arm operatively connected to said capsule for movement thereby as said capsule responds to changes in cabin absolute pressure and reservoir pressure whereby said switch arm as it is moved by said capsule into engagement with one or the other of said pair of contacts operatively controls actuation of said electro-responsive means and said discharge valve.

15. A pressure regulating instrument for use in a system for regulating pressure in an aircraft cabin whereinto air is supplied by an air delivery means and from which vitiated air is discharged through a valve regulated by electro-responsive means, comprising: a housing to be mounted within said cabin, said housing including wall means defining a reservoir; means carried by said housing forming a restricted orifice to place the reservoir in communication with the interior of the cabin for airflow into and out of said reservoir at a restricted rate to vary the air pressure in the reservoir in accordance with variations in cabin absolute pressure; a pressure responsive capsule mounted within said housing and responsive on the one side to changes in cabin absolute pressure and on the other side to changes in pressure within said reservoir; switch means mounted within said housing including means adapted to be operatively connected to said electro-responsive means; and switch actuator means operatively connected to said capsule and operable thereby as said capsule responds to changes in cabin absolute pressure and reservoir pressure to actuate said switch means to control operation of the electro-responsive control means of said discharge valve.

16. An instrument for controllably regulating pressure within an aircraft cabin whereinto air is continuously supplied by an air delivery means and having means for varying the rate of air discharged therefrom, comprising: a housing to be mounted within said cabin, said housing including wall means defining a reservoir; means carried by said housing forming a restricted orifice to place the reservoir in communication with the interior of said cabin for airflow into and out of said reservoir at a restricted rate to vary the air pressure in the reservoir in accordance with variations in cabin absolute pressure; a pair of contacts; means for mounting said contacts within said housing, said mounting means including means adapted to operatively connect said contacts respectively to pressure increase and pressure decrease control means actuating the air discharge varying means of said system; a pivotally mounted lever having one end thereof disposed between said contacts; a pressure responsive device subjected to the difference between cabin absolute pressure and reservoir pressure; means interconnecting said lever and said device whereby said lever is pivotally moved by said device as the same responds to changes in the difference between said pressures to move the one end of said lever into engagement with one or the other of said contacts to operatively control actuation of said pressure increase and pressure decrease control means; means for conjointly moving said contacts relative to said one end of the lever; and means for moving said contacts relative to each other to vary the relative spacing therebetween.

WOLFGANG B. KLEMPERER.

REFERENCES CITED

The following references are of record in the file of this patent:

UNITED STATES PATENTS

| Number | Name | Date |
|---|---|---|
| 1,557,822 | Foulk | Oct. 20, 1925 |
| 1,634,961 | Reeves | July 5, 1927 |
| 1,935,736 | Colvin et al. | Nov. 21, 1933 |
| 2,002,057 | Gregg | May 21, 1935 |
| 2,077,267 | Rogers | Apr. 13, 1937 |
| 2,208,554 | Price | July 16, 1940 |
| 2,307,199 | Cooper | Jan. 5, 1943 |
| 2,396,116 | Noxon | Mar. 5, 1946 |
| 2,549,690 | Klemperer | Apr. 17, 1951 |